Inventor
William Bowden
By his Attorneys
Rosenbaum, Stockbridge & Borst

UNITED STATES PATENT OFFICE.

WILLIAM BOWDEN, OF MANCHESTER, ENGLAND.

LIQUID-METER.

1,312,095.  Specification of Letters Patent.  Patented Aug. 5, 1919.

Application filed June 5, 1917. Serial No. 172,884.

*To all whom it may concern:*

Be it known that I, WILLIAM BOWDEN, a subject of the King of Great Britain and Ireland, and a resident of Manchester, in the county of Lancaster, England, have invented certain new and useful Improvements in Liquid-Meters, of which the following is a specification.

This invention relates to meters for delivering measured quantities of liquids and registering the total quantity delivered. The object of the invention is to provide a simple and reliable meter. Embodiments of the invention are applicable for metering liquids generally and are especially applicable for registering the consumption of liquid by internal combustion engines.

One embodiment of the invention applicable for metering the liquid fuel consumed by an internal combustion engine is illustrated in the accompanying drawings and from the following description thereof and the appended claims, the invention and its manner of operation will be fully understood and further embodiments or modifications of the invention apparent.

Of the drawings, Figures 1 and 2 are central vertical sections of the meter at right angles to each other. Fig. 2$^A$ is a part similar view to Fig. 2 illustrating a modification of a detail.

Referring to the drawings, 1 is a measuring chamber, 2 a receiving chamber, 3 an inlet to the measuring chamber and 4 an outlet therefrom to the receiving chamber 2 which is provided with a draw-off outlet $2^a$, to which the carbureter is connected.

Within the measuring chamber 1 are needle valves 5 and 6 for controlling the inlet 3 and outlet 4 respectively. The valves 5 and 6 are operatively connected by a rocking lever 7 pivoted at 8 to a lug 9 on the underside of the cover 10 of the measuring chamber 1. The ends of the arms $7^a$ and $7^b$ of the rocking lever 7 are bifurcated and co-act with and between collars $5^a$, $5^b$ and $6^a$, $6^b$ on the stems of the valves 5 and 6 respectively in such manner that when valve 5 is raised and opened valve 6 is depressed and closed, and vice versa. The upper ends of the stems of the valves 5 and 6 pass into tubular extensions 11 and $11^a$ on the cover 10 of the measuring chamber 1 and are formed with, or connected to, the plungers or cores 12 and 13 of solenoids 14 and 15 arranged on the extensions 11 and $11^a$ respectively.

Within the measuring chamber 1 is an inner chamber 16 the lower end of which extends into the receiving chamber 2 and in which is arranged a float casing 17 containing a float 18. The float casing 17 is fitted at its upper and lower ends with plugs 19 and 20 respectively, of insulating material. The inlet 3 leads into the chamber 16 and the latter also communicates with the chamber 1 by holes $16^a$ in its wall at the bottom of the chamber 1, and by notches $19^a$ in the upper plug 19 of the float casing 17, which plug fits in the top of the chamber 16. The float casing 17 communicates with the chamber 16 by holes $20^a$ and notches $20^b$ in the lower plug 20 of the float casing, which plug is of lesser external diameter than the internal diameter of the chamber 16. The float 18 has connected to it by a stem $18^a$ which passes through a central hole in the lower plug 20, a switch member 21, and it is guided in its movements by stems $18^b$ operating through holes in the upper plug 19.

The lower plug 20 carries contacts 22, $22^a$ with which the switch member 21 is adapted to co-act as hereinafter explained. The contacts 22, $22^a$ are connected by conductors 23, $23^a$ to terminals 24, $24^a$ respectively, on the cover 10.

The cover 10 of the measuring chamber 1 carries a second float casing 25 containing a float 26 and fitted at its lower end with a plug 27. The casing 25 communicates with measuring chamber 1 by means of holes $27^a$ and notches $27^b$ in the plug 27, and by holes $25^a$ in its wall immediately below the cover 10. The float 26 carries, by a stem $26^a$ which passes through a central hole in plug 27, a switch member 28, and plug 27 carries light spring contacts 29, $29^a$ with which switch member 28 is adapted to co-act, as hereinafter explained, and which are connected by conductors 30, $30^a$ (Fig. 5) to terminals 31, $31^a$ respectively, on the cover 10. The float 26 is guided in its movements by stems $26^b$ co-acting with holes in a perforated disk $25^b$ in the upper part of the float casing 25. The top of the float casing 25 is connected by means of a pipe 32 to the receiving chamber 2 and the float 26 carries a valve 33 adapted to coöperate with the air connection 32 as hereinafter explained.

One end of the winding of each of the solenoids 14 and 15 is connected to a common terminal 34 on the cover 10, to which one terminal of a battery or other source of electrical energy 35 (Fig. 5) is also connected by a lead 36. The other ends of the windings of the solenoids 14 and 15 are connected to the terminals 24 and 31$^a$ and the other terminal of the battery or other source of energy 35 is connected by a lead 37 and a conductor 38 to the terminals 24$^a$ and 31. Thus the circuit through solenoid 14 is from the battery or source 35, by lead 36, terminal 34, the winding of the solenoid, terminal 24, conductor 23, contact 22, switch member 21, contact 22$^a$, conductor 23$^a$, terminal 24$^a$, conductor 38 and lead 37 back to the battery or source 35. The circuit through solenoid 15 is from the battery or source 35, lead 36, terminal 34, the winding of the solenoid, terminal 31$^a$, conductor 30$^a$, contact 29$^a$, switch member 28, contact 29, conductor 30, terminal 31, conductor 38 and lead 37 back to the battery or source 35.

Figure 5:
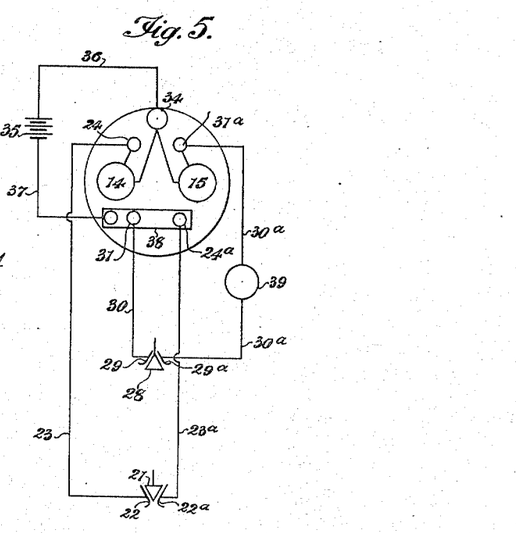
Fig. 5 is a diagram of the electrical connections.

An electrically operated registering device of any known and appropriate construction is provided in one or other of the circuits for the purpose of registering the number of times the measuring chamber is filled or emptied. In the diagram of Fig. 5 a device 39 is indicated in the circuit of the solenoid 15 between terminal 31$^a$ and contact 29$^a$, but it will be understood that the device may be arranged in any other position in the circuit or in the circuit of the solenoid 14.

Figure 6:
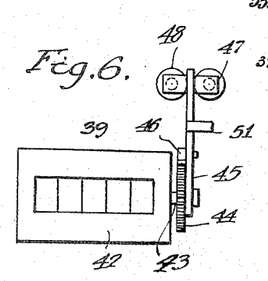
Figs. 6 and 7 are elevations at right angles to each other of registering means which I may employ.
Figure 7:
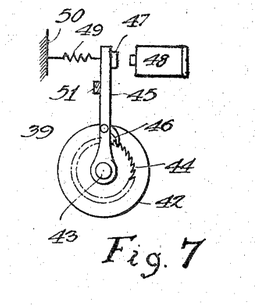

A suitable indicating device 39 is illustrated in Figs. 6 and 7 and comprises a counter 42 carried on shaft 43 on which are mounted a ratchet wheel 44 and an arm 45, the wheel 44 being fixed on the shaft and the arm loose thereon. The arm 45 carries a pawl 46 which coöperates with the ratchet wheel 44 and the free end of the arm carries the armature 47 of an electro-magnet 48 arranged in the circuit of the solenoid 15. A spring 49 connected to a fixed part 50 and the arm 45 normally retains the latter against a stop 51.

Figure 1:
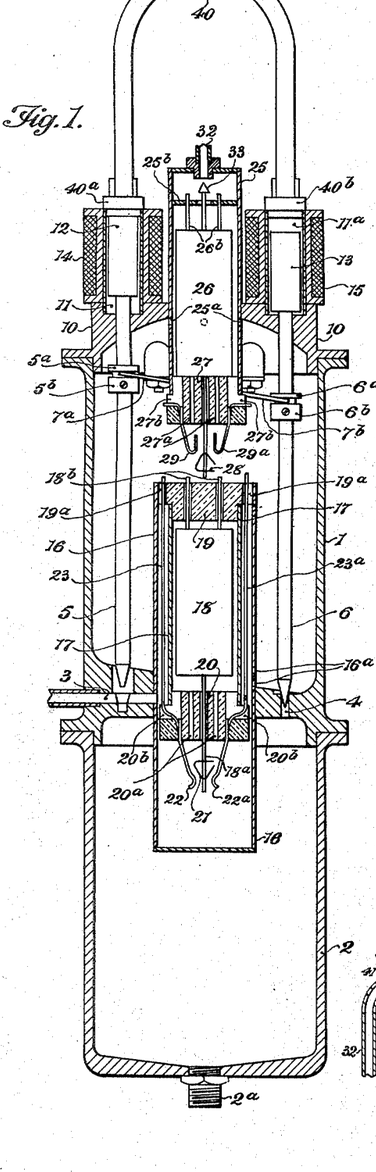

The operation of the apparatus is as follows:

Assuming both the measuring chamber 1 and the receiving chamber 2 to be empty, the floats 18 and 26 will be in their lowest positions, switch member 21 carried by float 18 will engage contacts 22, 22$^a$ and close the circuit through solenoid 14, while switch member 28 carried by float 26 will disengage contacts 29, 29$^a$ and open the circuit through solenoid 15. The energizing of solenoid 14 lifts plunger or core 12, thus raising valve 5 to open the inlet 3, and valve 5 by reason of its operative connection, by means of rocking lever 7, to valve 6 simultaneously depresses the latter to close outlet 4, as shown in Fig. 1. Liquid then flows via the inlet 3 which is connected to a suitable reservoir, into measuring chamber 1 and inner chamber 16 and from the latter into float casing 17 lifting the float 18, which raises the switch member 21, away from contacts 22, 22$^a$, thus breaking the circuit through solenoid 14. The air displaced by the entering liquid passes by way of the holes 27$^a$ and notches 27$^b$ in the plug 27 of the upper float casing 25 and the holes 25$^a$ in the wall of the latter into the casing, whence it flows past the valve 33 through the pipe 32 into the receiving chamber 2. Initially, the air displaced from the chamber 1 must be vented through the draw-off outlet 2$^a$ of the chamber 2 and the carbureter. As the liquid rises in the chamber 1 it passes by the holes 27$^a$ and notches 27$^b$ into the float chamber 25 and lifts the float 26, which lifts the switch member 28 into contact with contacts 29, 29$^a$, thus closing the circuit through solenoid 15 and the registering device 39. On the closing of this circuit the magnet 48 is energized and attracts its armature 47, thus actuating the arm 45 against the action of the spring 49 to operate the counter 42 and simultaneously plunger or core 13 is lifted to raise valve 6 to open outlet 4 and depress valve 5 to close inlet 3. The liquid in the chamber 1 then flows through the outlet 4 into the receiving chamber 2, the inlet of liquid to chamber 1 being meanwhile cut off by the closing of the valve 5 and the air in chamber 2 being displaced through pipe 32, past valve 33 into casing 25 and thence into chamber 1. As the level of the liquid in chamber 1 falls, float 26 also falls and disengages switch member 28 from contacts 29, 29$^a$, thus opening the circuit through solenoid 15 and registering device 39 whereupon the arm 45 is returned by spring 49 to normal position. The small quantity of liquid contained in inner chamber 16 above the level of the bottom of chamber 1 passes out through holes 16$^a$ and when all the liquid except that contained in the chamber 16 below the level of the bottom of chamber 1 has passed into chamber 2, float 18 falls and switch member 21 again engages contacts 22, 22$^a$ to close the circuit through solenoid 14, when the valve 5 is again opened and valve 6 closed and the cycle of operation is repeated. The subsequent filling of chamber 1 is controlled by the displacement of the air permitted by the drawing-off from receiving chamber 2 and the filling of chamber 1 is thus governed by the consumption by the engine.

If the drawing-off of liquid from receiving chamber 2 should cease while chamber 1 is filling, the air will be compressed and stop the flow into chamber 1. If the drawing off from receiving chamber 2 should cease while measuring chamber 1 is emptying the latter will continue to empty, but on the subsequent filling of measuring chamber 1 the air will be compressed and stop the flow thereto. If there should be a failure in the circuit through solenoid 15 while measuring chamber 1 is filling, float 26 will continue to rise after switch member 28 has engaged contacts 29, 29$^a$ and will lift valve 33 to close air connection 32, and prevent liquid from passing through the air connection 32 to receiving chamber 2. Failure of the circuit through solenoid 14 would result in the inlet valve 5 remaining closed after being closed by the opening of outlet valve 6.

In order to prevent the valves 5 and 6 from being affected by vibration and to retain them in the position into which they are operated by either solenoid until they are next operated by the other solenoid, I provide a permanent magnet 40 the pole pieces 40$^a$, 40$^b$ of which are fitted into the tubular extensions 11, 11$^a$ whereon the solenoids 14 and 15 are arranged, respectively. By this means, the valve 5 when raised by the energizing of solenoid 14 is held raised by the attraction of plunger or core 12 by pole 40$^a$ until solenoid 15 is energized to lift valve 6 when the latter is then held raised by the attraction of plunger or core 13 by pole 40$^b$.

When it is not desired that the total quantity of liquid delivered or consumed should be registered, but only that measured quantities of liquid should be delivered, the registering device 39 is dispensed with.

Figures 2, 2A:
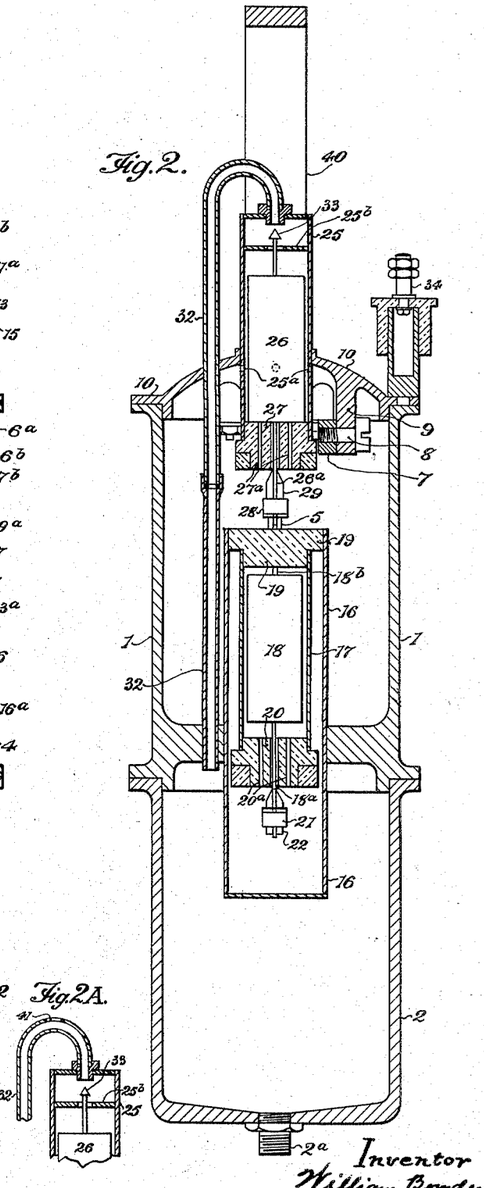
Figure 3:
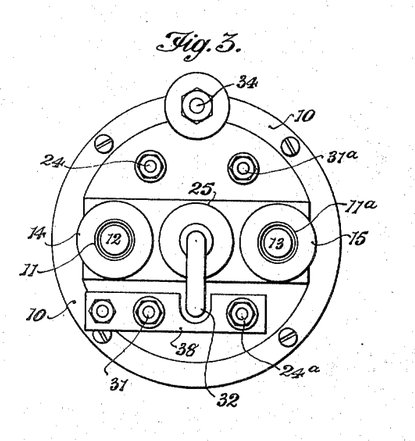
Fig. 3 is a plan of the meter and Fig. 4 is an underside plan of the top cover thereof.
Figure 4:
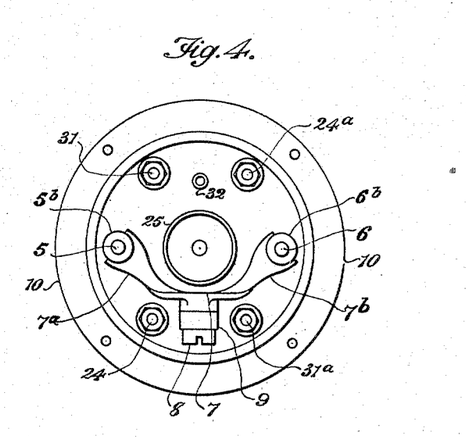

Instead of the air being displaced through pipe 32 from the measuring chamber 1 into the receiving chamber 2 and vice versa, during the filling of the chambers, there may, as shown in Fig. 2$^A$, be provided at the highest part of the pipe 32, a hole 41 which serves as a common vent for the displacement of the air from the chambers 1, and 2 during the alternate filling thereof, and for the inlet of air to the chambers during the emptying thereof. With the vent 41 the filling of measuring chamber 1 will not be governed by the emptying or drawing off from receiving chamber 2, but will be independent thereof.

What I claim as my invention, and desire to secure by Letters Patent is:—

1. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same operative when the measuring vessel is filled and emptied, and means for venting said vessels during the filling and emptying thereof.

2. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same operative when the measuring vessel is filled and emptied, means for venting said vessels during the filling and emptying thereof, and means for registering the filling or emptying of said measuring vessel.

3. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, operative means connecting said valves whereby when one is opened the other is closed, solenoids for operating said valves, electrical circuits including said solenoids, means for automatically closing the circuits through said solenoids alternately so that the inlet valve is closed and the outlet valve is opened when the measuring vessel is filled and the outlet valve is closed and the inlet valve is opened when the measuring vessel is emptied, and means for venting said vessels during the filling and emptying thereof.

4. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, operative means connecting said valves whereby when one is opened the other is closed, solenoids for operating said valves, electrical circuits including said solenoids, means for automatically closing the circuits through said solenoids alternately so that the inlet valve is closed and the outlet valve is opened when the measuring vessel is filled and the outlet valve is closed and the inlet valve is opened when the measuring vessel is emptied, means for venting said vessels during the filling and emptying thereof, and an electrical registering device in the circuit of one of said solenoids for registering the filling or emptying of said measuring vessel.

5. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, operative means connecting said valves whereby when one is opened the other is closed, solenoids for operating said valves, electrical circuits including said solenoids, plungers or cores connected to said valves and coöperative with said solenoids, floats in said measuring vessel and adapted to rise and fall with the level of the liquid therein, switch members operated by said floats to close and open the circuits through said solenoids alternately so that the inlet valve is closed and the outlet valve is opened when the measuring vessel is filled and the outlet valve is closed and the inlet valve is opened when the measuring vessel is emptied, and means for venting said vessels during the filling and emptying thereof.

6. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, operative means connecting said valves whereby when one is opened the other is closed, solenoids for operating said valves, plungers or cores connected to said valves, electrical circuits including said solenoids, and coöperative with said solenoids, floats in said measuring vessel and adapted to rise and fall with the level of the liquid therein, switch members operated by said floats to close and open the circuits through said solenoids alternately so that the inlet valve is closed and the outlet valve is opened when the measuring vessel is filled and the outlet valve is closed and the inlet valve is opened when the measuring vessel is emptied, means for venting said vessels during the filling and emptying thereof, and an electrical registering device in the circuit of one of said solenoids for registering the filling or emptying of said measuring vessel.

7. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, a pivoted rocking lever connecting said valves whereby when one is opened the other is closed, solenoids for operating said valves, electrical circuits including said solenoids, plungers or cores connected to said valves and coöperative with said solenoids, an upper float in said measuring vessel adapted to be raised by the liquid when said vessel is filled, a switch member operated by said float when raised to close the circuit through the solenoid coöperative with the outlet valve to energize said solenoid which then actuates its coöperative plunger or core to open the outlet valve and close the inlet valve, a lower float in said measuring vessel adapted to be raised by the liquid therein and to fall when the liquid passes into the receiving vessel, a switch member operated by said lower float when it falls to close the circuit through the solenoid coöperative with the inlet valve to energize said solenoid which then actuates its coöperative plunger or core to open the inlet valve and close the outlet valve, and means for venting said vessels during the filling and emptying thereof.

8. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, a pivoted rocking lever connecting said valves whereby when one is opened the other is closed, solenoids for operating said valves, electrical circuits including said solenoids, plungers or cores connected to said valves and coöperative with said solenoids, an upper float in said measuring vessel adapted to be raised by the liquid when said vessel is filled, a switch member operated by said float when raised to close the circuit through the solenoid coöperative with the outlet valve to energize said solenoid which then actuates its coöperative plunger or core to open the outlet valve and close the inlet valve, a lower float in said measuring vessel adapted to be raised by the liquid therein and to fall when the liquid passes into the receiving vessel, a switch member operated by said lower float when it falls to close the circuit through the solenoid coöperative with the inlet valve to energize said solenoid which then actuates its coöperative plunger or core to open the inlet valve and close the outlet valve, means for venting said vessels during the filling and emptying thereof, and an electrical registering device in circuit with one of said solenoids for registering the filling or emptying of said measuring vessel.

9. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same operative when the measuring vessel is filled and emptied, means for venting said vessels during the filling and emptying thereof, and means for closing the vent to said measuring vessel in the event of failure of said valve-operating means when said measuring vessel is filled.

10. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same operative when the measuring vessel is filled and emptied, means for venting said vessels during the filling and emptying thereof, and means for closing the vent to said measuring vessel in the event of failure of said valve-operating means when said measuring vessel is filled, and means for registering the filling or emptying of said measuring vessel.

11. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, a pivoted rocking lever connecting said valves whereby when one is opened the other is closed, solenoids for operating said valves, electrical circuits including said solenoids, plungers or cores connected to said valves and coöperative with said solenoids, an upper float in said measuring vessel adapted to be raised by the liquid when said vessel is filled, a switch member operated by said float when raised to close the circuit through the solenoid coöperative with the outlet valve to energize said solenoid which then actuates its coöperative plunger or core to open the outlet valve and close the inlet valve, a lower float in said measuring vessel adapted to be raised by the liquid therein and to fall when the liquid passes into the receiving vessel, a switch member operated by said lower float when it falls to close the circuit through the solenoid coöperative with the inlet valve to energize said solenoid which then actuates its coöperative plunger or core to open the inlet valve and close the outlet valve, means for venting said vessels during the filling and emptying thereof, and a valve adapted to be operated by said upper float to close the vent to said measuring vessel in the event of failure of the circuit of the solenoid coöperative with the outlet valve when said measuring vessel is filled.

12. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, a pivoted rocking lever connecting said valves whereby when one is opened the other is closed, solenoids for operating said valves, electrical circuits including said solenoids, plungers or cores connected to said valves and coöperative with said solenoids, an upper float in said measuring vessel adapted to be raised by the liquid when said vessel is filled, a switch member operated by said float when raised to close the circuit through the solenoid coöperative with the outlet valve to energize said solenoid which then actuates its coöperative plunger or core to open the outlet valve and close the inlet valve, a lower float in said measuring vessel adapted to be raised by the liquid therein and to fall when the liquid passes into the receiving vessel, a switch member operated by said lower float when it falls to close the circuit through the solenoid coöperative with the inlet valve to energize said solenoid which then actuates its coöperative plunger or core to open the inlet valve and close the outlet valve, means for venting said vessels during the filling and emptying thereof, and a valve adapted to be operated by said upper float to close the vent to said measuring vessel in the event of failure of the circuit of the solenoid coöperative with the outlet valve when said measuring vessel is filled, and an electrical registering device in circuit with one of said solenoids for registering the filling or emptying of said measuring vessel.

13. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same effective when said measuring vessel is filled and emptied, means for retaining said valves when operated until they are again operated, and means for venting said vessels during the filling and emptying thereof.

14. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same effective when said measuring vessel is filled and emptied, means for retaining said valves when operated until they are again operated, means for venting said vessels during the filling and emptying thereof, and means for registering the filling or emptying of said measuring vessel.

15. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same effective when said measuring vessel is filled and emptied, means for retaining said valves when operated until they are again operated, means for venting said vessels during the filling and emptying thereof, and means for closing the vent to said measuring vessel in the event of the failure of said valve-operating means when said measuring vessel is filled.

16. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same effective when said measuring vessel is filled and emptied, means for retaining said valves when operated until they are again operated, means for venting said vessels during the filling and emptying thereof, means for closing the vent to said measuring vessel in the event of the failure of said valve-operating means when said measuring vessel is filled, and means for registering the filling or emptying of said measuring vessel.

17. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, a pivoted rocking lever connecting said valves whereby when one is opened the other is closed, solenoids for operating said valves, electrical circuits including said solenoids, plungers or cores connected to said valves and coöperative with said solenoids, an upper float in said measuring vessel adapted to be raised by the liquid when said vessel is filled, a switch member operated by said float when raised to close the circuit through the solenoid coöperative with the outlet valve to energize said solenoid which then actuates its coöperative plunger or core to open the outlet valve and close the inlet valve, a lower float in said measuring vessel adapted to be raised by the liquid therein and to fall when the liquid passes into the receiving vessel, a switch member operated by said lower float when it falls to close the circuit through the solenoid coöperative with the inlet valve to energize said solenoid which then actuates its coöperative plunger or core to open the inlet valve and close the outlet valve, a permanent magnet having its poles operative with said plungers or cores to temporarily retain said valves in their operative positions, means for venting said vessels during the filling and emptying thereof, and a valve adapted to be operated by said upper float to close the vent to said measuring vessel in the event of failure of the circuit of the solenoid coöperative with the outlet valve when said measuring vessel is filled, and an electrical registering device in circuit with one of said solenoids for registering the filling or emptying of said measuring vessel.

18. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same operative when the measuring vessel is filled and emptied, and an air connection between said vessels for the displacement of the air therein from one vessel to the other alternately.

19. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same operative when the measuring vessel is filled and emptied, an air connection between said vessels for the displacement of the air therein from one vessel to the other alternately, and means for registering the filling or emptying of said measuring vessel.

20. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, operative means connecting said valves whereby when one is opened the other is closed, solenoids for operating said valves, electrical circuits including said solenoids, means for automatically closing the circuits through said solenoids alternately so that the inlet valve is closed and the outlet valve is opened when the measuring vessel is filled and the outlet valve is closed and the inlet valve is opened when the measuring vessel is emptied, and an air connection between said measuring and receiving vessels for the displacement of the air therein from one vessel to the other alternately.

21. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, operative means connecting said valves whereby when one is opened the other is closed, solenoids for operating said valves, electrical circuits including said solenoids, means for automatically closing the circuits through said solenoids alternately so that the inlet valve is closed and the outlet valve is opened when the measuring vessel is filled and the outlet valve is closed and the inlet valve is opened when the measuring vessel is emptied, an air connection between said measuring and receiving vessels for the displacement of the air therein from one vessel to the other alternately, and an electrical registering device in the circuit of one of said solenoids for registering the filling or emptying of said measuring vessel.

22. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, operative means connecting said valves whereby when one is opened the other is closed, solenoids for operating said valves, electrical circuits including said solenoids, plungers or cores connected to said valves and coöperative with said solenoids, floats in said measuring vessel and adapted to rise and fall with the level of the liquid therein, switch members operated by said floats to close and open the circuits through said solenoids alternately so that the inlet valve is closed and the outlet valve is opened when the measuring vessel is filled and the outlet valve is closed and the inlet valve is opened when the measuring vessel is emptied, and an air connection between said measuring and receiving vessels for the displacement of the air therein from one vessel to the other alternately.

23. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, operative means connecting said valves whereby when one is opened the other is closed, solenoids for operating said valves, electrical circuits including said solenoids, plungers or cores connected to said valves and coöperative with said solenoids, floats in said measuring vessel and adapted to rise and fall with the level of the liquid therein, switch members operated by said floats to close and open the circuits through said solenoids alternately so that the inlet valve is closed and the outlet valve is opened when the measuring vessel is filled and the outlet valve is closed and the inlet valve is opened when the measuring vessel is emptied, an air connection between said measuring and receiving vessels for the displacement of the air therein from one vessel to the other alternately, and an electrical registering device in the circuit of one of said solenoids for registering the filling or emptying of said measuring vessel.

24. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, a pivoted rocking lever connecting said valves whereby when one is opened the other is closed, solenoids for operating said valves, electrical circuits including said solenoids, plungers or cores connected to said valves and coöperative with said solenoids, an upper float in said measuring vessel adapted to be raised by the liquid when said vessel is filled, a switch member operated by said float when raised to close the circuit through the solenoid coöperative with the outlet valve to energize said solenoid which then actuates its coöperative plunger or core to open the outlet valve and close the inlet valve, a lower float in said measuring vessel adapted to be raised by the liquid therein and to fall when the liquid passes into the receiving vessel, a switch member operated by said lower float when it falls to close the circuit through the solenoid coöperative with the inlet valve to energize said solenoid which then actuates its coöperative plunger or core to open the inlet valve and close the outlet valve, and an air connection between said measuring and receiving vessels for the displacement of the air therein from one vessel to the other alternately.

25. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, a pivoted rocking lever connecting said valves whereby when one is opened the other is closed, solenoids for operating said valves, electrical circuits including said solenoids, plungers or cores connected to said valves and coöperative with said solenoids, an upper float in said measuring vessel adapted to be raised by the liquid when said vessel is filled, a switch member operated by said float when raised to close the circuit through the solenoid coöperative with the outlet valve to energize said solenoid which then actuates its coöperative plunger or core to open the outlet valve and close the inlet valve, a lower float in said measuring vessel adapted to be raised by the liquid therein and to fall when the liquid passes into the receiving vessel, a switch member operated by said lower float when it falls to close the circuit through the solenoid coöperative with the inlet valve to energize said solenoid which then actuates its coöperative plunger or core to open the inlet valve and close the outlet valve, and an air connection between said measuring and receiving vessels for the displacement of the air therein from one vessel to the other alternately, and an electrical registering device in circuit with one of said solenoids for registering the filling or emptying of said measuring vessel.

26. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same operative when the measuring vessel is filled and emptied, an air connection between said vessels for the displacement of the air therein from one vessel to the other alternately, and means for closing said air connection in the event of failure of said valve-operating means when said measuring vessel is filled.

27. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same operative when the measuring vessel is filled and emptied, an air connection between said vessels for the displacement of the air therein from one vessel to the other alternately, and means for closing said air connection in the event of failure of said valve-operating means when said measuring vessel is filled, and means for registering the filling or emptying of said measuring vessel.

28. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, a pivoted rocking lever connecting said valves whereby when one is opened the other is closed, solenoids for operating said valves, electrical circuits including said solenoids, plungers or cores connected to said valves and coöperative with said solenoids, an upper float in said measuring vessel adapted to be raised by the liquid when said vessel is filled, a switch member operated by said float when raised to close the circuit through the solenoid coöperative with the outlet valve to energize said solenoid which then actuates its coöperative plunger or core to open the outlet valve and close the inlet valve, a lower float in said measuring vessel adapted to be raised by the liquid therein and to fall when the liquid passes into the receiving vessel, a switch member operated by said lower float when it falls to close the circuit through the solenoid coöperative with the inlet valve to energize said solenoid which then actuates its coöperative plunger or core to open the inlet valve and close the outlet valve, an air connection between said measuring and receiving vessels for the displacement of the air therein from one vessel to the other alternately, and a valve adapted to be operated by said upper float to close said air connection in the event of failure of the circuit of the solenoid coöperative with the outlet valve when said measuring vessel is filled.

29. A liquid meter comprising in combination a measuring vessel provided with an inlet and an outlet, a receiving vessel communicating with said measuring vessel by means of said outlet when open and provided with a draw-off outlet, valves adapted to open and close said inlet and outlet alternately, a pivoted rocking lever connecting said valves whereby when one is opened the other is closed, solenoids for operating said valves, electrical circuits including said solenoids, plungers or cores connected to said valves and coöperative with said solenoids, an upper float in said measuring vessel adapted to be raised by the liquid when said vessel is filled, a switch member operated by said float when raised to close the circuit through the solenoid coöperative with the outlet valve to energize said solenoid which then actuates its coöperative plunger or core to open the outlet valve and close the inlet valve, a lower float in said measuring vessel adapted to be raised by the liquid therein and to fall when the liquid passes into the receiving vessel, a switch member operated by said lower float when it falls to close the circuit through the solenoid coöperative with the inlet valve to energize said solenoid which then actuates its coöperative plunger or core to open the inlet valve and close the outlet valve, an air connection between said measuring and receiving vessels for the displacement of the air therein from one vessel to the other alternately, and a valve adapted to be operated by said upper float to close said air connection in the event of failure of the circuit of the solenoid coöperative with the outlet valve when said measuring vessel is filled, and an electrical registering device in circuit with one of said solenoids for registering the filling or emptying of said measuring vessel.

30. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same effective when said measuring vessel is filled and emptied, means for retaining said valves when operated until they are again operated, and an air connection between said vessels for the displacement of the air therein from one vessel to the other alternately.

31. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same effective when said measuring vessel is filled and emptied, means for retaining said valves when operated until they are again operated, an air connection between said vessels for the displacement of the air therein from one vessel to the other alternately, and means for registering the filling or emptying of said measuring vessel.

32. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same effective when said measuring vessel is filled and emptied, means for retaining said valves when operated until they are again operated, an air connection between said vessels for the displacement of the air therein from one vessel to the other alternately, and means for closing said air connection in the event of the failure of said valve-operating means when said measuring vessel is filled.

33. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, means for operating said valves, means for automatically controlling said valve-operating means to render same effective when said measuring vessel is filled and emptied, means for retaining said valves when operated until they are again operated, an air connection between said vessels for the displacement of the air therein from one vessel to the other alternately, means for closing said air connection in the event of the failure of said valve-operating means when said measuring vessel is filled, and means for registering the filling or emptying of said measuring vessel.

34. A liquid meter comprising in combination, a measuring vessel provided with an inlet and an outlet, a receiving vessel communicating with said measuring vessel by means of said outlet when open and provided with a draw-off outlet, valves adapted to open and close said inlet and outlet alternately, a pivoted rocking lever connecting said valves whereby when one is opened the other is closed, solenoids for operating said valves, electrical circuits including said solenoids, plungers or cores connected to said valves and coöperative with said solenoids, an upper float in said measuring vessel adapted to be raised by the liquid when said vessel is filled, a switch member operated by said float when raised to close the circuit through the solenoid coöperative with the outlet valve to energize said solenoid which then actuates its coöperative plunger or core to open the outlet valve and close the inlet valve, a lower float in said measuring vessel adapted to be raised by the liquid therein and to fall when the liquid passes into the receiving vessel, a switch member operated by said lower float when it falls to close the circuit through the solenoid coöperative with the inlet valve to energize said solenoid which then actuates its coöperative plunger or core to open the inlet valve and close the outlet valve, a permanent magnet having its poles operative with said plungers or cores to temporarily retain said valves in their operative positions, an air connection between said measuring and receiving vessels for the displacement of the air therein from one vessel to the other alternately, and a valve adapted to be operated by said upper float to close said air connection in the event of failure of the circuit of the solenoid coöperative with the outlet valve when said measuring vessel is filled, and an electrical registering device in circuit with one of said solenoids for registering the filling or emptying of said measuring vessel.

In witness whereof I have hereunto set my hand.

WILLIAM BOWDEN.